(12) United States Patent
Williams et al.

(10) Patent No.: US 6,173,211 B1
(45) Date of Patent: Jan. 9, 2001

(54) APPARATUS AND METHOD FOR FABRIC PRINTING OF NESTED

(75) Inventors: Kevin M. Williams, Cromwell; Thomas N. Clarino, East Haven, both of CT (US)

(73) Assignee: Gerber Technology, Inc., Tolland, CT (US)

( * ) Notice: Under 35 U.S.C. 154(b), the term of this patent shall be extended for 0 days.

(21) Appl. No.: 09/060,990

(22) Filed: Apr. 15, 1998

(51) Int. Cl.$^7$ .................................................. G06F 19/00
(52) U.S. Cl. ........................................... 700/131; 700/135
(58) Field of Search ..................................... 700/131, 130, 700/132, 133, 134, 135, 167, 171

(56) References Cited

U.S. PATENT DOCUMENTS

| | | |
|---|---|---|
| 3,596,068 | 7/1971 | Doyle . |
| 3,875,389 | 4/1975 | McFadden et al. . |
| 4,435,837 | 3/1984 | Abernathy . |
| 4,785,750 | 11/1988 | Best . |
| 4,853,866 * | 8/1989 | Andrada Galan et al. ........... 364/470 |
| 5,172,326 * | 12/1992 | Campbell, Jr. et al. .............. 364/470 |
| 5,333,111 | 7/1994 | Chaiken et al. . |
| 5,353,355 | 10/1994 | Takagi et al. . |
| 5,412,578 | 5/1995 | Takagi et al. . |
| 5,487,011 | 1/1996 | Chaiken . |
| 5,508,936 | 4/1996 | King et al. . |
| 5,537,946 | 7/1996 | Sadeh et al. . |
| 5,559,709 | 9/1996 | Ohno et al. . |
| 5,791,215 * | 8/1998 | Morrison et al. .......................... 83/13 |
| 5,825,652 * | 10/1998 | LeBlond et al. ....................... 700/132 |
| 5,831,857 * | 11/1998 | Clarino et al. ......................... 700/135 |
| 5,886,319 * | 3/1999 | Preston et al. ................... 219/121.72 |
| 5,923,314 * | 7/1999 | Seto et al. ............................. 345/113 |
| 5,975,743 * | 11/1999 | Bercaits ................................ 700/134 |

FOREIGN PATENT DOCUMENTS

| | | |
|---|---|---|
| 0 607 539 A2 | 7/1994 | (EP) . |
| 0 613 288 A2 | 8/1994 | (EP) . |
| 03090607 | 4/1991 | (JP) . |

* cited by examiner

Primary Examiner—Thomas G. Black
Assistant Examiner—Mary Wang
(74) Attorney, Agent, or Firm—McCormick, Paulding & Huber LLP

(57) ABSTRACT

A method for making fabric pattern pieces for assembly into garments, upholstery or the like, with the fabric of each pattern piece having a fabric design with design features arranged in a predetermined manner with respect to the lines defining the boundary of the piece. The fabric design, which is printed on the fabric web by a computer-controlled dye-jet process, is printed only within the outlines of the desired pattern pieces. This avoids the problems previously associated with alignment of the pattern pieces relative to a repeating fabric design preprinted over the entire surface of the fabric web used as the work material and allows a more compact nesting of the pattern pieces on the web. An electronic pattern piece database is generated, including a template each of the desired pattern pieces. A graphical image representative of the desired fabric print design is also generated and combined with the pattern piece templates, care being taken to adjust the fabric print design in each individual pattern piece such that the match criteria are satisfied and the design appears as desired in the corresponding finished fabric piece. The patterned templates are then arranged in nested relation to produce a cutting and printing marker. This marker is utilized to control the printer which prints the desired pattern pieces on a sheet of plain unprinted fabric. The pattern pieces, printed with the appropriately aligned fabric design, are then cut from the fabric web.

7 Claims, 3 Drawing Sheets

APPARATUS AND METHOD FOR FABRIC PRINTING OF NESTED

FIELD OF THE INVENTION

The present invention relates in general to systems and methods for making garments, upholstery and the like from fabric webs, and deals more particularly with apparatus and methods for producing pattern pieces of predetermined configurations cut from web fabric material for assembly into garments or the like with the fabric of each pattern piece having a fabric design with design features arranged in a predetermined manner with respect to lines that define the boundary of the piece.

BACKGROUND OF THE INVENTION

Computerized generation of fabric cutting markers is well known in the art. Known systems include those offered by the assignee of the present invention, such as Gerber Garment Technology, Inc. (GGT) AccuMark marker making systems. In general, these known systems utilize a marker generated with a computer to optimize pattern piece density and thereby minimize the waste of fabric. However, fabrics which have a plaid, stripe, print or other regularly repeating fabric design are troublesome in that the clothing designer may require a specific alignment of the fabric design in several pattern pieces which lie adjacent to or on top of one another in the finished garment or other product. Consequently, the highest density of pattern pieces in the marker placed over the fabric, or otherwise used for cutting the fabric, is not necessarily the one which provides the specified fabric design alignment. Stated another way, markers which provide the specified fabric design alignment are generally of lower pattern piece density than comparable markers taking no account of the fabric design. This, in turn, results in a higher proportion of fabric wastage.

Many of the fabrics of concern, in particular those bearing a regularly repeated design other than stripes or plaids, are produced by a printing process wherein the design is printed on a suitable plain, unprinted fabric. Rotary plate and silk-screen printing, or variations thereof, have long been used for this purpose. It is now also possible to print on fabric using multiple, minute jets of appropriate inks, dyes or pigments. This process is analogous to the widely used ink-jet paper printing process. Like ink-jet printing on paper, jet printing on fabric is performed under the control of a computer.

It is, therefore, an object of the present invention to provide an apparatus and method for producing fabric pattern pieces, with the fabric of each pattern piece having a matched print design with the design features arranged in a predetermined manner with respect to the lines defining the boundary of the piece, while minimizing fabric wastage.

SUMMARY OF THE INVENTION

The present invention is directed to an apparatus and method of making pattern pieces from work material with each pattern piece carrying a printed design for assembly into garments and the like. The design is printed only within, or so as to expand only slightly outside of, the boundaries of the pattern pieces. This avoids the problems previously associated with alignment of the pattern pieces relative to a repeating design preprinted over the entire surface of the work material and allows a more compact nesting of the pattern pieces on the work material. An electronic pattern piece database is generated, having a template for each of the desired pattern pieces.

Graphical images, representative of the repeatable portion of the design, are also generated and are combined individually with the pattern piece templates. The templates are then arranged in nested relation to create a cutting and printing marker wherein a fabric print design appears in each piece as desired, both as to orientation and match, in the corresponding finished pattern pieces. The cutting and printing marker is then utilized to control a cutter for cutting the pattern pieces from the web and a printer for printing the desired designs onto the fabric web in the areas corresponding to the pattern pieces, with the printing preferably occurring prior to the cutting.

To combine the fabric print design with the pattern piece templates, the templates are taken one-at-a-time, from the database and visually displayed. The displayed template is first rotated into a desired orientation. Then an image of a swatch of the fabric print design is superimposed on the template image and properly positioned with respect to the match points included within the template confines. The fabric print pattern is then repeated in both coordinate directions so as to completely fill the template. A record of the oriented and pattern-covered template is stored in a holding file or database. Finally, the records are arranged in nested relation to create the cutting and printing marker.

By individually adjusting the print design in each of the pattern pieces, concerns previously related to the design repeat of the fabric are obviated. It is thus possible to nest the pattern pieces on the fabric sheet as closely as if no design were involved. This closer nesting of the pattern pieces minimizes fabric wastage.

Other objects and advantages of the present invention will become apparent in view of the following detailed description and accompanying drawings.

DETAILED DESCRIPTION OF THE PREFERRED EMBODIMENT

Figure 1:
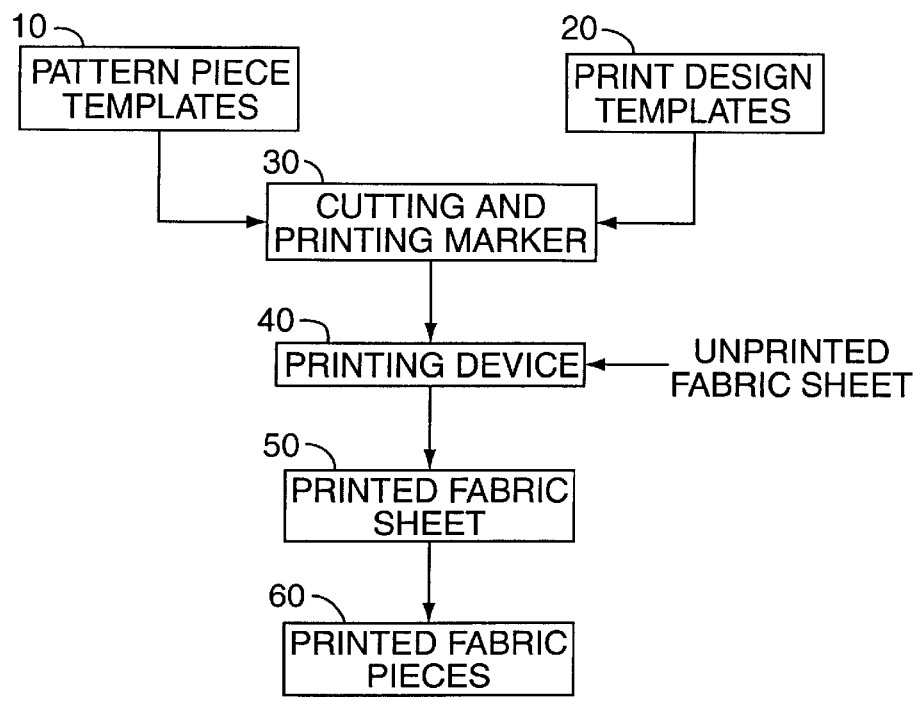
FIG. 1 is a diagrammatic representation of a pattern piece printing process in accordance with the present invention.

As diagrammaticaly illustrated in FIG. 1, a method of making fabric pattern pieces, in accordance with the present invention, begins with the generation of a pattern piece database 10 that is stored in a computer processor (not shown). The pattern piece database 10 is an electronic file of templates each corresponding to one of the pattern pieces. These templates include match points which are located within the template confines and used to orient a pattern piece on a marker, as explained in detail herein after. The pattern piece database may be generated by different systems known to those skilled in the pertinent art, however, one such system found to be particularly effective, is the AccuMark™ marker making system manufactured and sold by Gerber Garment Technology, Inc. (GGT).

In addition to the pattern piece templates, electronically generated graphical images or templates corresponding to fabric print designs are also generated and stored in the database, as indicated by the box 20 in FIG. 1. These templates can be generated by different systems known to those skilled in the pertinent art. One such system found to be particularly useful in generating print design images is known as the Artworks System, manufactured and sold by GGT.

Still referring to FIG. 1, one or more of the fabric print design templates can be combined with one or more of the pattern piece templates, by means hereinafter described, to create a cutting and printing marker 30, wherein the fabric print design appears individually in each piece as it would in the corresponding finished pattern piece.

A dye-jet printing apparatus, diagrammatically illustrated as 40 in FIG. 1, responsive to commands issued from the controller and suitable for printing on fabric, is also provided. One such printing apparatus is the NOVAJET PROS-ERIES sold by Encad, Inc. of San Diego, Calif. While a dye-jet printer has been described, the present invention is not limited in this regard as other types of printers, such as an ink-jet, or thermal printer can be substituted without departing from the broader aspects of the present invention.

The cutting and printing marker is used by the controller to issue commands to the printing device, instructing it to print the cutting and printing marker onto a web of fabric. Preferably, the fabric is initially unprinted, however, the present invention is not limited in this regard as the marker could also be printed onto a piece of patterned fabric 50. The printed fabric pattern pieces 60 may then be cut from the web, either manually or by means of a cutter responsive to commands issued from the controller.

Figure 2:
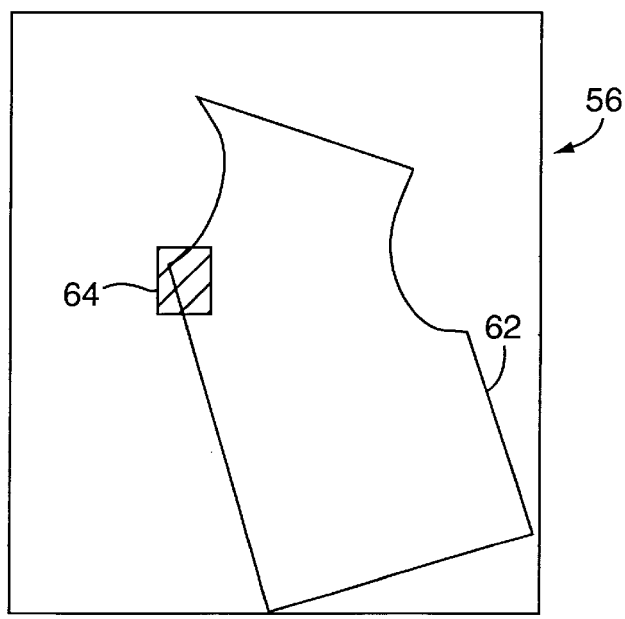
FIG. 2 is a diagrammatic representation showing an individual pattern swatch aligned with a match point on the pattern piece.

Turning now to FIG. 2, a pattern piece template 62, selected from the pattern piece database 10, FIG. 1, is shown on a video display 56. The image shown on the display 56 represents a piece or sheet of fabric that will be printed with the pattern pieces and then cut. The displayed pattern piece 62 can be rotated to the desired orientation with respect to the fabric sheet. A "swatch" of the fabric print design 64 is positioned on the pattern piece and is rotated into alignment with the pattern piece 62. Since each fabric swatch 64 has an identifiable repeat pattern, only one swatch needs to be stored in the database, thereby reducing the amount of disk storage required to implement the system.

Figure 3:
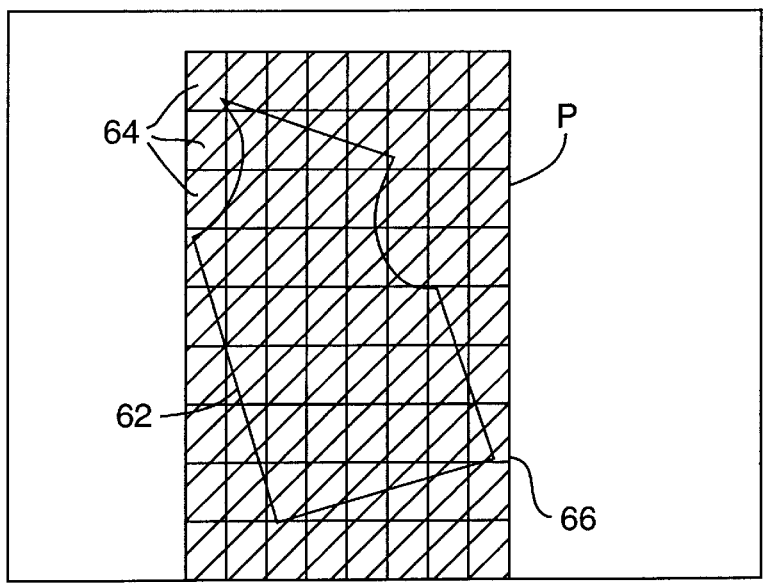
FIG. 3 is a diagrammatic representation of a pattern piece encompassed by a min/max box filled with a design.

As shown in FIG. 3, with the orientation of the fabric print design swatch 64 relative to the pattern piece 62 determined, the computer processor next computes an area referred to as the min/max box 66 that defines a perimeter "P" encompassing the displayed pattern piece. Next, in accordance with commands issued from the computer processor the min/max box 66 is filled with a plurality of individual swatches 64 and shown on the display 56 as a continuous fabric pattern. The position of each of the fabric swatches 62 will be identified by the computer processor with at least two coordinates, preferably Cartesian X and Y, that will be stored in machine readable format in the database. With the min/max box 66 filled with the above-described swatches 64, the computer processor will next compute where the peripheral edges of the pattern piece 62 intersect the swatches.

Figure 4:
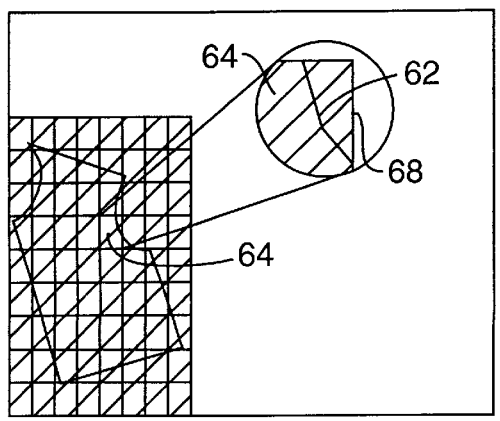
FIG. 4 is a partial view of a pattern piece showing an areal portion of the design extending past the boundary of the pattern piece.

As shown in FIG. 4, as an intersection is located, the system will electronically clip the particular swatch 64 creating a geometric structure 68 corresponding to the clipped areal portion of the swatch that falls outside of the pattern piece 62. This information will then be stored in the database. This process will continue until all of the swatches 64 have been analyzed. The resulting database will contain a swatch bitmap image, a series of X and Y coordinates identifying the placement and orientation of each of the swatches 64, a geometric definition of the pattern piece(s) 62, and a series of clipped geometric sections 68.

Figure 5:
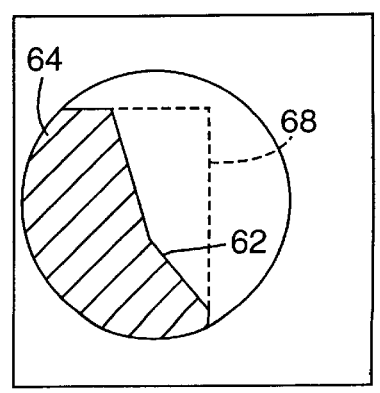
FIG. 5 is a view of the areal portion and pattern piece of FIG. 4 with the areal portion filled with a transparent color.

Referring to FIG. 5, subsequent to the creation and expansion of the database to contain the above-described data, the computer processor next identifies each pixel in the clipped geometric sections 68 (dotted lines, FIG. 5) of each swatch 64, that extend outside of the boundary of the corresponding pattern piece 62. The character of each of these pixels will then be altered such that the pixel is transparent, or a color that can be mapped to a specific printing device's non-printing color. Accordingly, only the fabric pattern within the perimeter of the pattern piece(s) shape will be displayed and subsequently printed. This allows for pattern pieces to be arranged in a nested sequence creating the printing and cutting marker.

It will be appreciated by the reader that individually adjusting the fabric print design in each of the pattern pieces obviates the concerns related to the design repeat of the fabric, i.e. no design alignment is required between pattern pieces on the fabric web. Furthermore, by printing design-bearing fabrics, the need to maintain large fabric inventories is eliminated.

Figure 6:
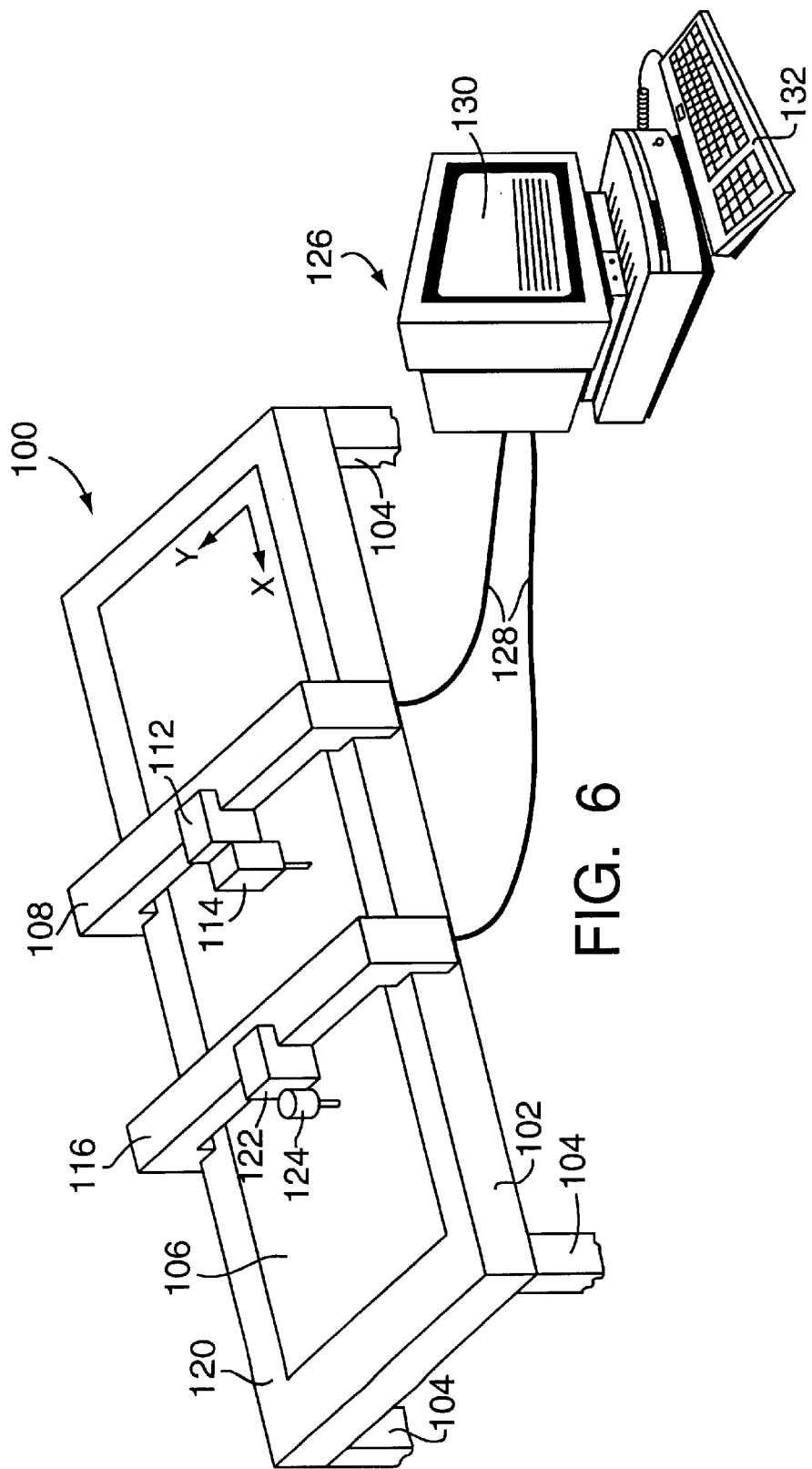
FIG. 6 is a perspective view of the apparatus of the present invention.

Referring now to FIG. 6, a fabric printing and cutting apparatus, which is referred to generally with the reference character 100, is shown having a table 102 supported on legs 104. The table 102 includes a flat upper work surface 120 adapted to support a workpiece 106.

A first carriage 108, which transversely spans the table 102, is supported for movement in a first coordinate direction X and movably carries thereon a cutter carriage 112 mounted for movement in a second coordinate direction Y.

The cutter carriage 112 has a cutter head 114 mounted thereon. Those skilled in the art will recognize that various cutting devices, including rotating blades, reciprocating blades, lasers, or water jets may be employed in the cutter head 114 without departing from the broader aspects of the present invention.

A second carriage 116, also transversely spans the table 102 and is supported for longitudinal movement, similar to the first carriage 108. The second carriage 116 movably carries thereon a printer carriage 122 mounted for movement in the Y direction.

The printer carriage 122 has a print head 124 mounted thereon. that employs a pigment jet printer, such as, but not limited to a dye-jet or ink-jet, although other types of printer, such as thermal transfer printers.

The printing and cutting apparatus 100 includes a controller 126 which sends and receives signals on lines 128 and processes those signals. The controller includes a video display 130 of a known type, as well as a keyboard 132. The controller includes a computer processor that has sufficient computer memory and other peripheral hardware to perform the functions set forth herein above.

The present invention may have particular application to short production runs and the preparation of prototypes or samples. It is also especially well suited to the creation of full sized, printed patterns for home sewing. In such an application, the purchaser could specify the garment style, size, color and fabric design desired. The appropriate pattern pieces would then be printed on a fabric web, to be later cut and sewn. It would also be possible to print sewing instructions, or piece identifications, directly onto the fabric. While repeated reference has been made to garment making, it should be apparent that the present invention has equal applicability to upholstery and the like.

As will be recognized by those skilled in the pertinent art, numerous changes and modifications may be made to the above-described and other embodiments of the present invention without departing from its scope as defined in the appended claims. In particular, it should be recognized that various other processes may be utilized for combining the fabric print design image with the cutting marker, the process chosen being largely dependent upon the memory capacity and processing speed of the computer used. Also, it should be recognized that the printing and cutting operations may be performed by separate systems, both utilizing the cutting and printing marker in turn. Alternatively, cutting may be performed manually. Accordingly, the detailed description of the preferred embodiment herein is to be taken in an illustrative as opposed to a limiting sense.

What is claimed is:

1. A method of making pattern pieces, with each pattern piece having a print design arranged within the lines defining the boundary of the piece, the method comprising the steps of:

providing a printing apparatus for printing pattern pieces and designs within said pattern pieces onto a sheet of work material;

providing a controller operatively coupled to said printing apparatus for issuing command signals to said printing apparatus;

generating an electronic pattern piece database that includes a template of each of said pattern pieces stored in said controller;

generating an image representative of a repeatable portion of a design to be printed onto said pattern pieces and storing said image in said controller;

generating a perimeter that encompasses the boundary defined by each of said pattern pieces;

filling said perimeter with a plurality of said repeatable portions positioned in a side-by-side relationship relative to one another;

defining areal portions of said plurality of repeatable images that extend outside of said boundary defined by each of said pattern pieces;

changing said areal portions in such a manner as to be non-printable, thereby causing said perimeters to include pattern pieces filled with said design and surrounded by non-printable areal portions; and storing said pattern pieces and said non-printable areal portions in said controller; and operating said printing apparatus in accordance with commands issued from said controller to print said marker onto said work material.

2. A method of making fabric pattern pieces as defined by claim 1, further including the steps of:

providing a cutting apparatus for cutting said pattern pieces from said work material; and causing said cutting apparatus to cut said pattern pieces from said work material in accordance with said cutting and printing marker to in response to commands issued from said controller.

3. An apparatus for making fabric pattern pieces, with the fabric of each pattern piece having a fabric print design with design features arranged in a predetermined manner with respect to lines defining the boundary of each pattern piece, said apparatus comprising:

a numerically controlled printing apparatus for printing a desired fabric print design on a web of unprinted fabric;

a controller for controlling said printing apparatus, said controller including memory means for storing data therein;

a means for creating a electronic pattern piece database, including a template of each of the desired pattern pieces, in said controller;

means for generating a graphical image representative of a swatch of a desired fabric print design, said swatch being indicative of the repeatable portion of said fabric print design;

means for generating a graphical image in said controller representative of each of the desired pattern pieces being filled with a plurality of said swatches positioned in a side-by-side relationship relative to one another such that each pattern piece corresponds to a pattern piece with the desired print design thereon;

means for generating a bit map indicative of the position of each of said swatches on each of said pattern pieces;

means for storing an image of said swatch and said bit map of said pattern pieces in said memory means of said controller, thereby requiring greatly reduced memory than if each of said pattern pieces filled with said pattern were stored individually; and means for combining said fabric design graphical image with said pattern piece database to create a cutting and printing marker wherein the fabric print design appears individually in each pattern piece as desired in the corresponding finished fabric pieces.

4. The apparatus of claim 3, wherein said controller includes a video display device and said fabric print design graphical image is displayed thereon.

5. The apparatus of claim 3, further comprising a numerically controlled cutting device, operatively connected to said controller, for cutting printed pattern pieces from a fabric sheet.

6. The apparatus of claim 3, wherein said printing apparatus includes means for projecting multiple jets of pigmented colorant onto a fabric web.

7. The apparatus of claim 5, further comprising means for utilizing said cutting and printing marker to control said cutting device.

* * * * *

UNITED STATES PATENT AND TRADEMARK OFFICE
CERTIFICATE OF CORRECTION

PATENT NO. : 6,173,211
DATED : January 25, 2001
INVENTOR(S) : Williams et al.

It is certified that error appears in the above-identified patent and that said Letters Patent is hereby corrected as shown below:

On the Title Page, In the Title:

After "NESTED", insert --PRINTED IMAGES--.

Signed and Sealed this

Twenty-ninth Day of May, 2001

Attest:

NICHOLAS P. GODICI

Attesting Officer     *Acting Director of the United States Patent and Trademark Office*